United States Patent [19]

Kang

[11] Patent Number: 5,760,841
[45] Date of Patent: Jun. 2, 1998

[54] APPARATUS FOR CONVERTING A VIDEO SIGNAL OUTPUT FROM COMPOSITE VIDEO INSTRUMENT AND METHOD THEREFOR

[75] Inventor: Bong-Soon Kang, Seoul, Rep. of Korea

[73] Assignee: Samsung Electronics Co., Ltd., Kyungki-do, Rep. of Korea

[21] Appl. No.: 724,900

[22] Filed: Oct. 3, 1996

[30] Foreign Application Priority Data

Oct. 6, 1995 [KR] Rep. of Korea ............ 1995-34322

[51] Int. Cl.$^6$ ............................................. H04N 5/46
[52] U.S. Cl. .................... 348/558; 348/604; 348/663
[58] Field of Search .............................. 348/558, 604, 348/663, 712, 713; H04N 5/46

[56] References Cited

U.S. PATENT DOCUMENTS 5,347,318   9/1994   Kobayashi .......................... 348/558
5,589,888  12/1996   Iwasaki ............................... 348/604

*Primary Examiner*—Sherrie Hsia
*Attorney, Agent, or Firm*—Sughrue, Mion, Zinn, Macpeak & Seas, PLLC

[57] ABSTRACT

An apparatus and method for converting a video signal output from a composite video instrument, by which the operating state of a system or the manufacturing state of a system board can be easily recognized, is disclosed. When a normal video signal is not input, a monochrome/color signal component is output to be displayed on a screen. The monochrome/color signal component has either a value internally set by a system, or a value set in accordance with externally supplied data to then be displayed on a screen. The apparatus includes a monochrome/color signal separator for receiving a quantized composite video signal and separating a monochrome signal component and a color signal component, a color signal demodulator for separating a color component from the color signal component output from the monochrome/color signal separator, a lock detector for detecting whether a signal input to the color signal demodulator or a signal output therefrom is normal, a color signal controller for multiplexing the color signal component output from the color signal demodulator and the variably set color signal component, and a monochrome signal controller for multiplexing the monochrome signal component output from the monochrome/color signal separator and the variably set monochrome signal component.

12 Claims, 3 Drawing Sheets

APPARATUS FOR CONVERTING A VIDEO SIGNAL OUTPUT FROM COMPOSITE VIDEO INSTRUMENT AND METHOD THEREFOR

FIELD OF THE INVENTION

The present invention relates to an apparatus for converting a video signal output from a composite video instrument and a method therefor, and more particularly, to an apparatus and method for converting a video signal output from a composite video instrument, by which the operating state of a system or the manufacturing state of a system board can be easily recognized by outputting a monochrome/color signal component with a value internally set by a system when a normal video signal is not input, or by outputting the same for display on a screen in accordance with externally supplied data.

BACKGROUND OF THE INVENTION

In general, the capabilities of an integrated circuit (IC) used for signal processing in fields related to multi-media video have advanced from being limited to signal processing according to only one broadcast specification (such as NTSC, PAL or SECOM), to being able to selectively process input signals of a multitude of broadcast specifications. For example, CCIR601 is a proposed specification in which the format of a quantized video signal after processing does not vary according to the respective broadcasting method specifications.

In order to output the quantized video signal specified in the CCIR601, a monochrome signal and a color signal are separated from the quantized composite video signal. In the separated color signal component, since a horizontal color signal component (Cb) and vertical color signal component (Cr) are modulated with color carrier signals, a color signal demodulation is necessary for separating color components therefrom.

It is detected whether a signal applied during a demodulation process is normal or lock. Accordingly, the existing system performs a function as a color killer such that a monochrome signal is allowed to pass through as it is and the horizontal component (Cb) and vertical component (Cr) of a color signal are output as a fixed white color bar.

The video signal processing for the existing multimedia system operated as stated above is equipped with many kinds of functions which can be externally adjusted by a user. Thus, in cases of an abnormal input signal, an incorrectly adjusted external value, or an erroneously fabricated board, it requires much time to check which type of problem is present. Also, in checking the board fabricated using the IC having the aforementioned functions, video signals should be continuously supplied for a screen display.

FIG. 1 is a block diagram of a video signal converter output from a conventional composite video instrument. As shown in FIG. 1, if a composite video signal quantized by a monochrome/color signal separator 1 is input, the composite video signal is separated into a monochrome signal component Y and a color signal component C. Since the color signal component C cannot be extracted due to the modulation of its horizontal and vertical component signals (Cb and Cr) with color carrier signals, the color signal component C is supplied to a color signal demodulator 2 to then be demodulated.

The color signal demodulated in color signal demodulator 2 is supplied to a second delay 4 and to a lock detector 3. Lock detector 3 determines whether or not an input video signal is a normal video signal. As a result, if the input is a normal video signal, a lock signal LOCK output from lock detector 3 is "1." If the input is an abnormal video signal, lock detector 3 outputs "0."

Second delay 4 receives the color component signals Cb and Cr output from color signal demodulator 2, and synchronizes the color signals Cb and Cr with a clock so that the synchronized signals can then be output if the lock signal LOCK output from lock detector 3 is "1." If the lock signal LOCK output from lock detector 3 is "0," the color signals Cb and Cr are fixed as being white and are then output. A first delay 5 synchronizes the monochrome signal Y extracted from monochrome/color signal separator 1 with a clock to then be output.

According to the conventional apparatus operated as described above, if there is no input video signal during the checking of the fabricated board, the video signal should be separately supplied by a user.

SUMMARY OF THE INVENTION

To solve the above problems, it is an object of the present invention to provide an apparatus and method for converting a video signal output from a composite video instrument, by which the operating state of a system or the manufacturing state of a system board can be easily recognized by outputting monochrome/color signal component with a value internally set by a system when a normal video signal is not input, or by outputting the same in accordance with externally supplied data to then be displayed on a screen.

To accomplish the above object, there is provided an apparatus for converting a video signal output from a composite video instrument comprising: monochrome/color signal separating means for receiving a quantized composite video signal and separating a monochrome signal component and a color signal component to then be output; color signal demodulating means for separating a color component from the color signal component output from the monochrome/color signal separating means; lock detecting means for detecting whether a signal input to the color signal demodulating means or a signal output therefrom is normal to output a corresponding lock signal; color signal controlling means for multiplexing the color signal component output from the color signal demodulating means and a variably set color signal component to then be output; and monochrome signal controlling means for multiplexing the monochrome signal component output from the monochrome/color signal separating means and the variably set monochrome signal component to then be output.

Also, to accomplish the object of the present invention, there is provided a method for converting a video signal output from a composite video instrument comprising the steps of: determining whether or not a quantized composite video signal contains a color signal; demodulating a color signal if it is detected in the color signal determining step that the quantized composite video signal contains the color signal; determining whether or not the signal demodulated in the color signal demodulating step is a normal video signal; and synchronizing the color signal with a clock and outputting the same if it is determined in the video signal determining step that the demodulated signal is a normal video signal.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENT

Figure 1:
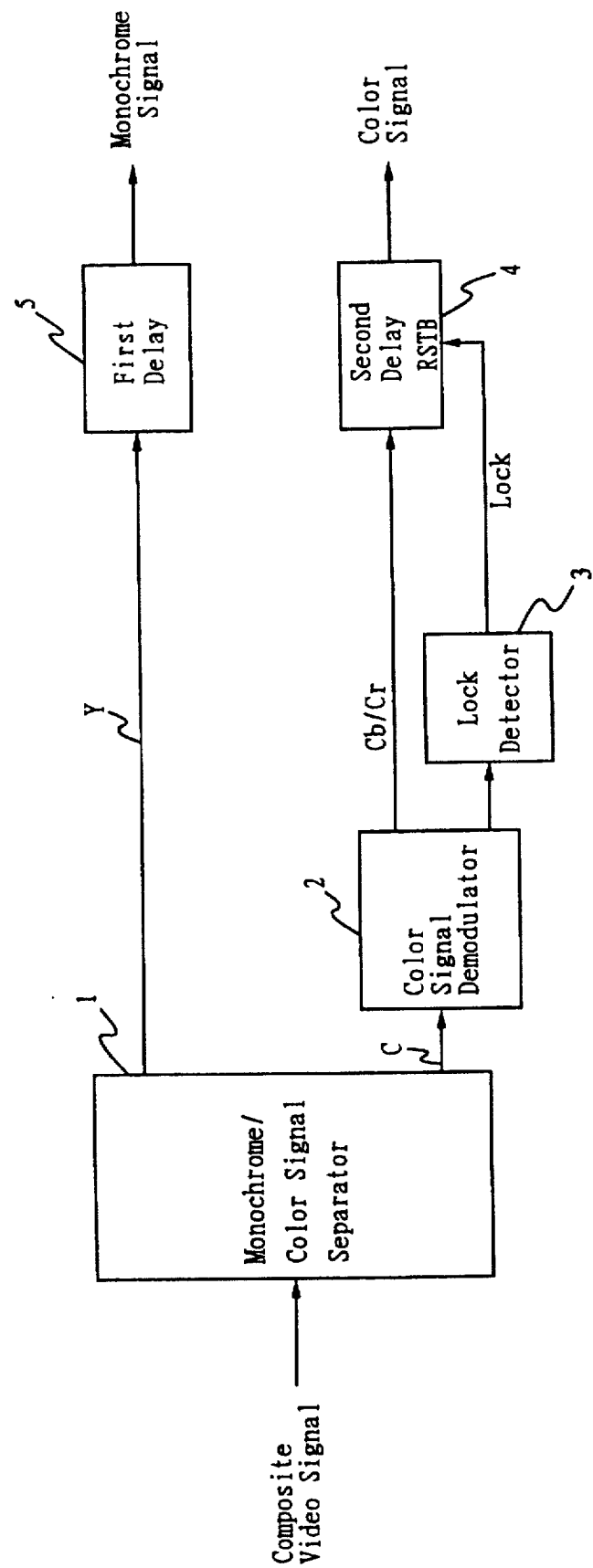
FIG. 1 is a block diagram of a conventional apparatus for converting a video signal output from a composite video instrument.
Figure 2:
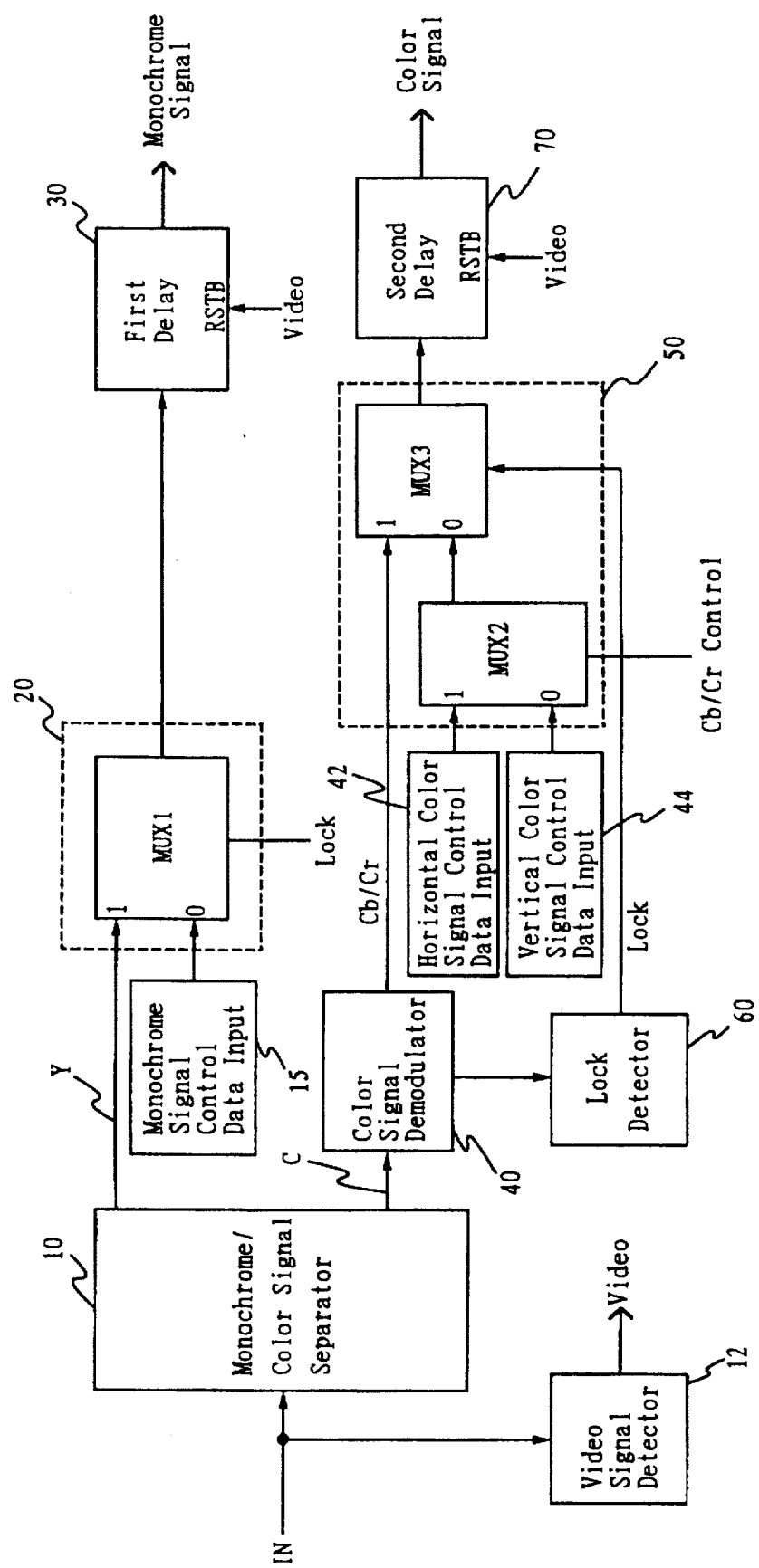
FIG. 2 is a block diagram of an apparatus for converting a video signal output from a composite video instrument according to the present invention.

In FIG. 2, a monochrome/color signal separator 10 receives a quantized composite video signal and separates the signal into a monochrome signal component and a color signal component to then be output. A color signal demodulator 40 demodulates the color signal component output from monochrome/color signal separator 10 so that a horizontal color signal component and a vertical color signal component each modulated with a color carrier signal are separated.

A lock detector 60 detects whether or not a signal output from color signal demodulator 40 is normal and, if the signal is normal, supplies a lock signal having a high level to first and third multiplexers MUX1 and MUX3 of a monochrome signal controller 20 and a color signal controller 50 to be described later.

Color signal controller 50 includes a second multiplexer MUX2 for multiplexing and outputting data output from a horizontal color signal control data input 42 and a vertical color signal control data input 44 in accordance with signals Cb and Cr supplied externally for determining whether the color signal to be displayed on a screen is a horizontal color signal or a vertical color signal, and a third multiplexer MUX3 for multiplexing and outputting the signal component output from second multiplexer MUX2 and the color signal component output from color signal demodulator 40 in accordance with the level of the lock signal.

A second delay 70 is constituted by a D-flipflop for detecting whether a video signal is input to monochrome/color signal separator 10 and outputting a color signal component output from color signal controller 50 according to the output of a video signal detector 12 for outputting the corresponding video signal, or outputting a color signal set as an initial value.

Monochrome signal controller 20 is constituted by a first multiplexer MUX1 for multiplexing and outputting a signal output from a monochrome signal control data input 15 for inputting data for adjusting a monochrome signal component with a user's desired value and a monochrome signal component Y output from monochrome/color separator 10 in accordance with a lock signal output from a lock detector 60.

A first delay 30 is constituted by a D-flipflop for detecting whether a video signal is input to monochrome/color signal separator 10 and outputting a monochrome signal component output from monochrome signal controller 20 according to the output of a video signal detector 12 for outputting the corresponding video signal, or outputting a monochrome signal set as an initial value.

The operation of the apparatus for converting a video signal output from a composite video instrument according to the aforementioned embodiment of the prevention will now be described in detail with reference to FIG. 3.

Figure 3:
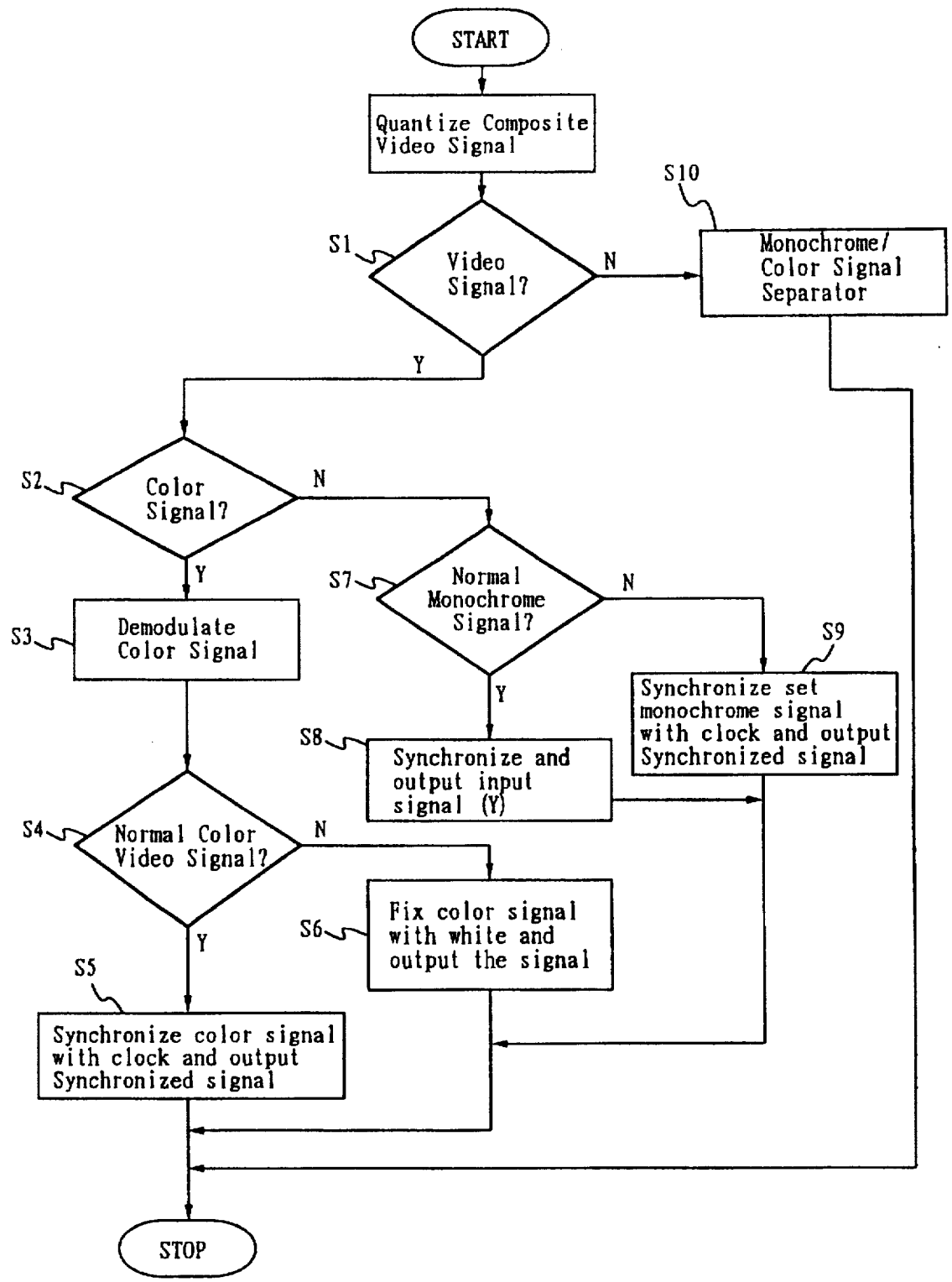
FIG. 3 is a flowchart for explaining the operation if an apparatus for converting a video signal output from a composite video instrument according to the present invention.

When a composite video signal picked up by a system adopting the apparatus for converting a video signal output from a composite video instrument according to the aforementioned embodiment of the prevention, is quantized, as shown in FIG. 3, it is determined in step 1 whether or not there is an input video signal. If there is no input video signal, a value set as an initial value is output in step S10. If there is an input video signal in step S1, it is determined in step S2 if there is a color signal or not. If not, it is determined in step S7 if the signal is a normal monochrome signal or not. If the quantized composite video signal is input to monochrome/color signal separator 10 via input port IN shown in FIG. 2, the composite video signal is separated into a monochrome signal component Y and a color signal component C in monochrome/color signal separator 10. The horizontal and vertical signal components Cb and Cr of the color signal component C are modulated with a color carrier signal, which disables the color components to be extracted. Thus, the color signal component C is supplied to color signal demodulator 40 to then be demodulated in step S3 shown in FIG. 3.

The color signals Cb and Cr demodulated in color signal demodulator 40 are supplied to a first input port of third multiplexer MUX3. Simultaneously, it is detected in step S4 whether or not a normal video signal is output from color signal demodulator 40. If a normal video signal is detected, lock detector 60 outputs a lock signal having a value of "1". Otherwise, lock detector 60 outputs a lock signal having a value of "0".

An output signal of second multiplexer MUX2 for multiplexing data output from horizontal and vertical color signal control data inputs 42 and 44 is supplied to a second input port of third multiplexer MUX3.

As described above, when the color signal output from color signal demodulator 40 and the output signal of second multiplexer MUX2 are supplied to an input port of third multiplexer MUX3, if the level of the lock signal output from lock detector 60 is "1," third multiplexer MUX3 multiplexes and outputs the signal output from color signal demodulator 40. On the contrary, if the level of the lock signal output from lock detector 60 is "0," third multiplexer MUX3 multiplexes and outputs the signal output from second multiplexer MUX2.

In step 5, the from color signal controller 50, which is either a color signal component of a normal color signal or a color signal set as an initial value, is synchronized with a clock and is output.

The monochrome signal Y output from monochrome/color separator 10 is multiplexed with the signal output from monochrome signal control data input 15 for inputting data for adjusting the monochrome signal component with a user's desired value in accordance with the lock signal output from lock detector 60 after being supplied to first input port of first multiplexer MUX1 of monochrome signal controller 20, to then be supplied to first delay 30.

If first delay 30 detects that there is a video signal input to monochrome/color separator 10, in steps S8 and S9, the monochrome signal component output from monochrome signal controller 20 is output in accordance with the output of video signal detector 12 so that either the corresponding video signal or the monochrome signal set as an initial value is output for a screen display.

According to the present invention, if there is no normal input video signal, the color signal is fixed with a white signal (S6) and a monochrome/color signal component is output using a value internally set in a system to then be displayed on a screen. Therefore, the operative state of the system and fabrication state of a system board can be easily checked.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. An apparatus for converting a video signal output from a composite video instrument, the apparatus comprising:

monochrome/color signal separating means for receiving a quantized composite video signal and separating a monochrome signal component and a color signal component and outputting the monochrome signal component and the color signal component;

color signal demodulating means for demodulating a color signal from said color signal component output from said monochrome/color signal separating means;

lock detecting means for detecting whether one of a signal input to said color signal demodulating means and the color signal output therefrom is normal and outputting a corresponding lock signal based on the detection;

color signal controlling means for multiplexing said color signal output from said color signal demodulating means and a variably set color signal component and outputting a first multiplexed signal; and monochrome signal controlling means for multiplexing said monochrome signal component output from said monochrome/color signal separating means and a variably set monochrome signal component and outputting a second multiplexed signal.

2. An apparatus for converting a video signal output from a composite video instrument as claimed in claim 1, wherein said lock detecting means detects whether or not the color signal output from said color signal demodulating means is a normal signal and outputs a lock signal having a predetermined level to peripheral equipment.

3. An apparatus for converting a video signal output from a composite video instrument as claimed in claim 2, further comprising monochrome signal control data input means for inputting data for adjusting the monochrome signal component with a user's desired value, wherein said monochrome signal controlling means is constituted by a first multiplexer for multiplexing and outputting a signal output from said monochrome signal control data input means and the monochrome signal component output from said monochrome/color separating means in accordance with the lock signal output from said lock detecting means.

4. An apparatus for converting a video signal output from a composite video instrument as claimed in claim 1, wherein said color signal controlling means includes a second multiplexer for multiplexing and outputting data output from a horizontal color signal control data input means and a vertical color signal control data input means in accordance with signals supplied externally for determining whether a color signal to be displayed on a screen is a horizontal color signal or a vertical color signal, and a third multiplexer for multiplexing and outputting an output from said second multiplexer and the color signal component output from said color signal demodulating means in accordance with the level of said lock signal.

5. An apparatus for converting a video signal output from a composite video instrument as claimed in claim 2, wherein said color signal controlling means includes a second multiplexer for multiplexing and outputting data output from a horizontal color signal control data input means and a vertical color signal control data input means in accordance with signals supplied externally for determining whether a color signal to be displayed on a screen is a horizontal color signal or a vertical color signal, and a third multiplexer for multiplexing and outputting an output from said second multiplexer and the color signal component output from said color signal demodulating means in accordance with the level of said lock signal.

6. An apparatus for converting video signal output from a composite video instrument as claimed in claim 3, wherein a first delay means is constituted by a D-flipflop for detecting whether a video signal is input to said monochrome/color signal separating means and outputting the monochrome signal component output from said monochrome signal controlling means according to the output of a video signal detecting means for outputting the corresponding video signal, or outputting a monochrome signal set as an initial value.

7. An apparatus for converting a video signal output from a composite video instrument as claimed in claim 1, further comprising:

a video signal detecting means for outputting a signal corresponding to whether or not the quantized composite video signal is input to said monochrome/color signal separating means;

a second delay means for receiving the first multiplexed signal output from said color signal controlling means and delaying the received signal for output according to the signal output by the video signal detecting means.

8. An apparatus for converting a video signal output from a composite video instrument as claimed in claim 1, wherein a first delay means is constituted by a D-flipflop for detecting whether a video signal is input to said monochrome/color signal separating means and outputting the monochrome signal component output from said monochrome signal controlling means according to the output of a video signal detecting means for outputting the corresponding video signal, or outputting a monochrome signal set as an initial value.

9. A method for converting a video signal output from a composite video instrument comprising the steps of:

determining whether or not a quantized composite video signal contains a color signal;

demodulating the color signal if it is detected in said color signal determining step that said quantized composite video signal contains the color signal;

determining whether or not the signal demodulated in said color signal demodulating step is a normal video signal;

and synchronizing said color signal with a clock and outputting the same if it is determined in said video signal determining step that said demodulated signal is the normal video signal.

10. A method for converting video signal output from a composite video instrument as claimed in claim 9, said method further comprising the step of:

determining whether or not the quantized composite video signal is a normal monochrome signal if it is determined in said color signal determining step that the quantized composite video signal does not contain the color signal.

11. A method for converting video signal output from a composite video instrument as claimed in claim 10, said method further comprising the step of:

synchronizing said quantized composite video signal with a clock if it is determined that said quantized composite video signal is a normal monochrome signal and outputting the synchronized clock and quantized composite video signal.

12. A method for converting a video signal output from a composite video instrument as claimed in claim 10, said method further comprising the step of:

changing a monochrome signal to a preset level and synchronizing said quantized composite video signal with a clock if it is determined that said quantized composite video signal is not the normal monochrome signal and outputting the synchronized clock and quantized composite video signal.

* * * * *